(12) United States Patent
Hinkley

(10) Patent No.: US 9,234,341 B1
(45) Date of Patent: Jan. 12, 2016

(54) TWO-PHASE EXTRACTION AND WASTE WATER REGENERATION SYSTEMS AND METHODS FOR SERVICING STORM WATER MANAGEMENT TECHNOLOGIES

(71) Applicant: James B. Hinkley, Portland, OR (US)

(72) Inventor: James B. Hinkley, Portland, OR (US)

( * ) Notice: Subject to any disclaimer, the term of this patent is extended or adjusted under 35 U.S.C. 154(b) by 340 days.

(21) Appl. No.: 13/831,747

(22) Filed: Mar. 15, 2013

Related U.S. Application Data

(60) Provisional application No. 61/682,211, filed on Aug. 11, 2012.

(51) Int. Cl.
| | | |
|---|---|---|
| *E03F 5/10* | (2006.01) | |
| *E03F 7/10* | (2006.01) | |
| *E03F 1/00* | (2006.01) | |

(52) U.S. Cl.
CPC . *E03F 1/008* (2013.01); *E03F 1/00* (2013.01); *E03F 5/105* (2013.01); *E03F 7/103* (2013.01)

(58) Field of Classification Search
CPC ............. E03F 1/00; E03F 1/001; E03F 1/002; E03F 5/10; E03F 5/101; E03F 5/102; E03F 5/105; E03F 5/14; E03F 2201/00; E03F 1/008; E03F 7/10; E03F 7/13
USPC ............ 210/170.03, 257.1, 747.2, 747.3, 241
See application file for complete search history.

(56) References Cited

U.S. PATENT DOCUMENTS

| | | | |
|---|---|---|---|
| 4,227,893 A | 10/1980 | Shaddock | |
| 4,578,198 A * | 3/1986 | Schmidt et al. | 210/241 |
| 5,341,539 A | 8/1994 | Sheppard et al. | |
| 5,520,803 A | 5/1996 | Russell et al. | |
| 5,979,012 A | 11/1999 | Fritz | |
| 6,082,630 A | 7/2000 | Bohrer | |
| 6,719,910 B1 | 4/2004 | Thiem et al. | |
| 6,790,368 B1 * | 9/2004 | Vachon et al. | 210/241 |
| 7,001,519 B2 | 2/2006 | Linden et al. | |
| 7,011,743 B2 * | 3/2006 | Use et al. | 210/170.03 |
| 7,025,887 B1 | 4/2006 | Kirts et al. | |
| 7,314,549 B2 * | 1/2008 | Swift | 210/170.03 |
| 7,455,780 B1 | 11/2008 | Joyner et al. | |
| 7,578,930 B2 | 8/2009 | Williamson et al. | |
| 7,651,624 B2 * | 1/2010 | Parr | 210/241 |
| 7,909,910 B2 | 3/2011 | Benner | |
| 8,318,021 B2 | 11/2012 | Armour | |

(Continued)

OTHER PUBLICATIONS

City of Portland, Environmental Services Source Control Division, Environmentally Responsible Best Management Practices, Maintaining Catch Basins, Brochure, at least as early as Mar. 12, 2013, 2 Pages USA.

(Continued)

*Primary Examiner* — Christopher Upton
(74) *Attorney, Agent, or Firm* — Law Office of Karen Dana Oster, LLC

(57) ABSTRACT

A preferred storm water management technology servicing system includes: (a) a waste water collection and storage subsystem for removing waste water from the storm water management technology; (b) a sediment collection and storage subsystem for removing sediment from the storm water management technology; and (c) a waste water regeneration subsystem for at least partially regenerating the waste water from the waste water collection and storage subsystem to create regenerated water. The storm water management technology servicing system may be used for a method for servicing storm water management technology.

34 Claims, 12 Drawing Sheets

(56) References Cited

U.S. PATENT DOCUMENTS

| | | | |
|---|---|---|---|
| 8,354,030 B1 | 1/2013 | Schuh | |
| 8,518,268 B1 | 8/2013 | Nauertz | |
| 2006/0157428 A1* | 7/2006 | Brody | 210/801 |
| 2007/0068878 A1* | 3/2007 | Stever et al. | 210/170.03 |
| 2008/0217257 A1* | 9/2008 | Pank | 210/747 |
| 2011/0147293 A1 | 6/2011 | Imahashi | |

OTHER PUBLICATIONS

IDS Water, Industrial Wastewater Treatment Products, Web Site, www.idswater.com/water/us/industrial_wastewater_treatment_products/205/products_category.html, at least as early as Jun. 21, 2012, pp. 1-2, USA.

Siemens AG 2011, Mobile and Temporary Water Treatment Services, Web Site, www.water.siemens.com/en/services/mobileandtemporary/Pages/default.aspx, at least as early as Jun. 21, 2012, pp. 1-2, USA.

Southeast Michigan Council of Governments (SEMCOG), Street and Parking Lots, Catch-Basin Maintenance, Brochure, at least as early as Mar. 12, 2013, 4 Pages, USA.

Vactor Manufacturing, Inc., Vactor 2100 Series Positive Displacement Sewer Cleaner, Brochure, at least as early as Mar. 12, 2013, 3 Pages, USA.

Vactor Manufacturing, Inc., Vactor 2100 Plus CB, Brochure, at least as early as 2012, 8 Pages, USA.

U.S. Environmental Protection Agency, National Pollutant Discharge Elimination System (NPDES), Storm Drain System Cleaning, Web Site, fpub.epa.gov/npdes/stormwater/menuofbmps/index.cfm?action=browse&Rbutton=detail&bmp=102, at least as early as Jun. 22, 2012, pp. 1-2, USA.

U.S. Environmental Protection Agency, National Pollutant Discharge Elimination System (NPDES), Clean Water Act, Web Site, fpub.epa.gov/npdes/cwa.cfm?program_id+45, at least as early as Feb. 21, 2013, pp. 1-2, USA.

* cited by examiner

TWO-PHASE EXTRACTION AND WASTE WATER REGENERATION SYSTEMS AND METHODS FOR SERVICING STORM WATER MANAGEMENT TECHNOLOGIES

The present application is an application claiming the benefit of U.S. Provisional Patent Application Ser. No. 61/682,211, filed Aug. 11, 2012. The present application is based on and claims priority from this application, the disclosure of which is hereby expressly incorporated herein by reference in its entirety.

BACKGROUND OF THE INVENTION

Described herein are systems and methods for servicing storm water management technology and, more specifically, two-phase extraction and waste water regeneration systems and methods for servicing storm water management technologies. Further, the systems and methods described herein may include returning regenerated waste water to the point source.

As described herein, the phrase "storm water management technology" can be defined as technologies and structures used to catch water runoff. Much of this water comes from rain. As water flows towards the storm water management technology, additional "pollutants" are picked up and carried along with the water towards the storm water management technology. The pollutants may be liquids (e.g. oil and chemicals) and/or solids (e.g. soil, sand, gravel, and/or other debris). The combination of the rain (storm water) and the liquid pollutants is generally referred to as "waste water." The combination of the rain (storm water) and the solid pollutants is generally referred to as "sediment." Common storm water management technology, incorporates "gravity separation" of the waste water from the sediment. Exemplary storm water management technology includes, but is not limited to, storm drains, catch basins, water vaults, storm filter vaults, oil/water vaults, detention ponds, drywells, underground injection control (UIC), harvest tanks, and sediment manholes for holding waste water and solid waste mixed with the waste water. FIG. 1 shows the exemplary storm water management technology (point source 100) in which the storm water and debris is divided into a top liquid portion (waste water 102) and a bottom solid portion (sediment 104).

In 1972, the Environmental Protection Agency (EPA) amended the Federal Water Pollution Control Act (the Clean Water Act or CWA) to provide statutory basis for their permit program, National Pollutant Discharge Elimination System (NPDES), and the basic structure for regulating the discharge of pollutants from point sources to waters of the United States (receiving waters). EPA regulations and/or other state regulations may, therefore, require that non-hazardous waste water treatment be performed on waste water and sediment associated with storm water management technology near commercial facilities and the parking lots of commercial facilities. Typical maintenance methods of storm water management technology require regular cleaning and service.

One of the most common maintenance methods is the cleaning and commercial service provided by Vactor trucks. Vactor trucks simply vacuum or collect the combined waste water and sediment at the source of collection (also referred to as the point source or the storm water management technology).

Waste water treatment systems are designed using "standard principles of waste water treatment" to achieve a specific water quality. These principles consist of a wide variety of treatment technologies to achieve a specific water quality. Standard systems are fabricated and offered as static (stationary) units and/or as mobile (temporary) treatment systems. The parameters for water quality are determined by the intended use and are set forth by EPA regulations and parameters. Water quality standards are categorized based on treatment for human consumption, industrial use, or use in the environment.

The following references describe systems that may be used for comparison and contrast with the systems and methods described herein.

U.S. Pat. No. 4,227,893 to Shaddock is directed to an industrial loader vehicle that handles both wet and dry waste materials. The vehicle has a single engine driving the vehicle to a pick-up site, powering all of the components to load the vehicle at the site, driving the vehicle to an unloading site, and dumping the waste materials as desired at the unloading site.

U.S. Pat. No. 5,341,539 to Sheppard et al. is directed to an apparatus for cleaning waste collection systems of solid materials using normal and injected water flow to suspend the solids in a slurry. A submersible pump moves the slurry from a collection point up to a pressurized container where the water content of the slurry is decanted and reused as injection water while the particulate material settles to the bottom of the pressurized container. When the container is filled with solid material it may be removed for emptying at a waste dump.

U.S. Pat. No. 6,082,630 to Bohrer is directed to a vehicle mounted high pressure water cleaning apparatus (pressure washer) includes a water delivery system, hydraulic system, and an electrical system working together to provide, alternatively, high pressure water for a cleaning operation, or recirculation of high pressure water back to a water tank. The hydraulic system is operable to either direct water toward a cleaning operation, or to wind in or extend out the water delivery hose while either supplying water to the delivery hose under pressure or recirculating the water back to the water tank.

U.S. Pat. No. 7,909,910 to Benner is directed to a vacuum clean-out system including a separator chamber and an associated collection chamber for removing liquid material and debris from a vacuum output and providing a vacuum return line free of contaminants. A vacuum exhaust line is coupled to a cyclonic separator chamber that induces a circular rotation within the incoming vacuum stream, causing the liquid and debris to impinge the chamber's surfaces and fall to the bottom thereof while the "clean" vacuum is drawn upwards into a return line.

U.S. Patent Application Publication No. 2011/0147293 to Imahashi is directed to a waste water treatment ship that purifies and treats oil bearing waste water collected from a ship or the sea.

BRIEF SUMMARY OF THE INVENTION

Described herein are systems, subsystems, and methods for servicing storm water management technology and, more specifically, two-phase extraction and waste water regeneration systems and methods for servicing storm water management technologies. Further, the systems and methods described herein may include returning regenerated waste water to the point source.

A preferred storm water management technology servicing system includes: (a) a waste water collection and storage subsystem for removing waste water from the storm water management technology; (b) a sediment collection and storage subsystem for removing sediment from the storm water management technology; and (c) a waste water regeneration subsystem for at least partially regenerating the waste water from the waste water collection and storage subsystem to create regenerated water.

Preferably, the regenerated water returnable to the storm water management technology. Preferably, the regenerated water returnable to a regenerated water disposal site. Preferably, the system further includes a pressure washing subsystem for pressure washing the storm water management technology. The pressure washing subsystem may use the regenerated water to pressure wash the storm water management technology. Preferably, the waste water collection and storage subsystem includes at least one liquid suction apparatus and at least one liquid storage container, the waste water being transferrable from the storm water management technology to the at least one liquid storage container via the at least one liquid suction apparatus. Preferably, the sediment collection and storage subsystem includes at least one solids suction apparatus and at least one solids containment container, the waste water being transferrable from the storm water management technology to the at least one solids containment container via the at least one solids suction apparatus. Preferably, the waste water regeneration subsystem may be used to perform at least one treatment step to create the regenerated water.

An exemplary preferred storm water management technology servicing system may include a waste water collection and storage subsystem, a sediment collection and storage subsystem, and a waste water regeneration subsystem. The waste water collection and storage subsystem preferably removes waste water from the storm water management technology, and may include at least one liquid suction apparatus and at least one liquid storage container. The waste water is preferably transferrable from the storm water management technology to the at least one liquid storage container via the at least one liquid suction apparatus. The sediment collection and storage subsystem preferably removes sediment from the storm water management technology. The sediment collection and storage subsystem preferably includes at least one solids suction apparatus and at least one solids containment container. Preferably the sediment is transferrable from the storm water management technology to the at least one solids containment container via the at least one solids suction apparatus. Preferably, the waste water regeneration subsystem at least partially regenerates the waste water from the waste water collection and storage subsystem to create regenerated water. The waste water regeneration subsystem may perform at least one treatment step to create the regenerated water.

A method for servicing storm water management technology includes the steps of: (a) removing waste water from the storm water management technology; (b) removing sediment from the storm water management technology; and (c) at least partially regenerating the waste water to create regenerated water. Preferably the method further includes the step of returning the regenerated water to the storm water management technology, disposing of the regenerated water at a regenerated water disposal site, and/or pressure washing the storm water management technology. Pressure washing the storm water management technology may be performed using the regenerated water. Preferably, the step of removing waste water further includes the step of using at least one liquid suction apparatus to transfer the waste water from the storm water management technology to at least one liquid storage container. Preferably, the step of removing sediment further includes the step of using at least one solids suction apparatus to transfer the sediment from the storm water management technology to at least one solids containment container. Preferably, the step of at least partially regenerating the waste water further includes the step of performing at least one treatment step.

The subject matter described herein is particularly pointed out and distinctly recited in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL
VIEWS OF THE DRAWINGS

The accompanying drawings illustrate various exemplary systems and methods for servicing storm water management technology and/or provide teachings by which the various exemplary systems and methods for servicing storm water management technology are more readily understood.

Figure 1:
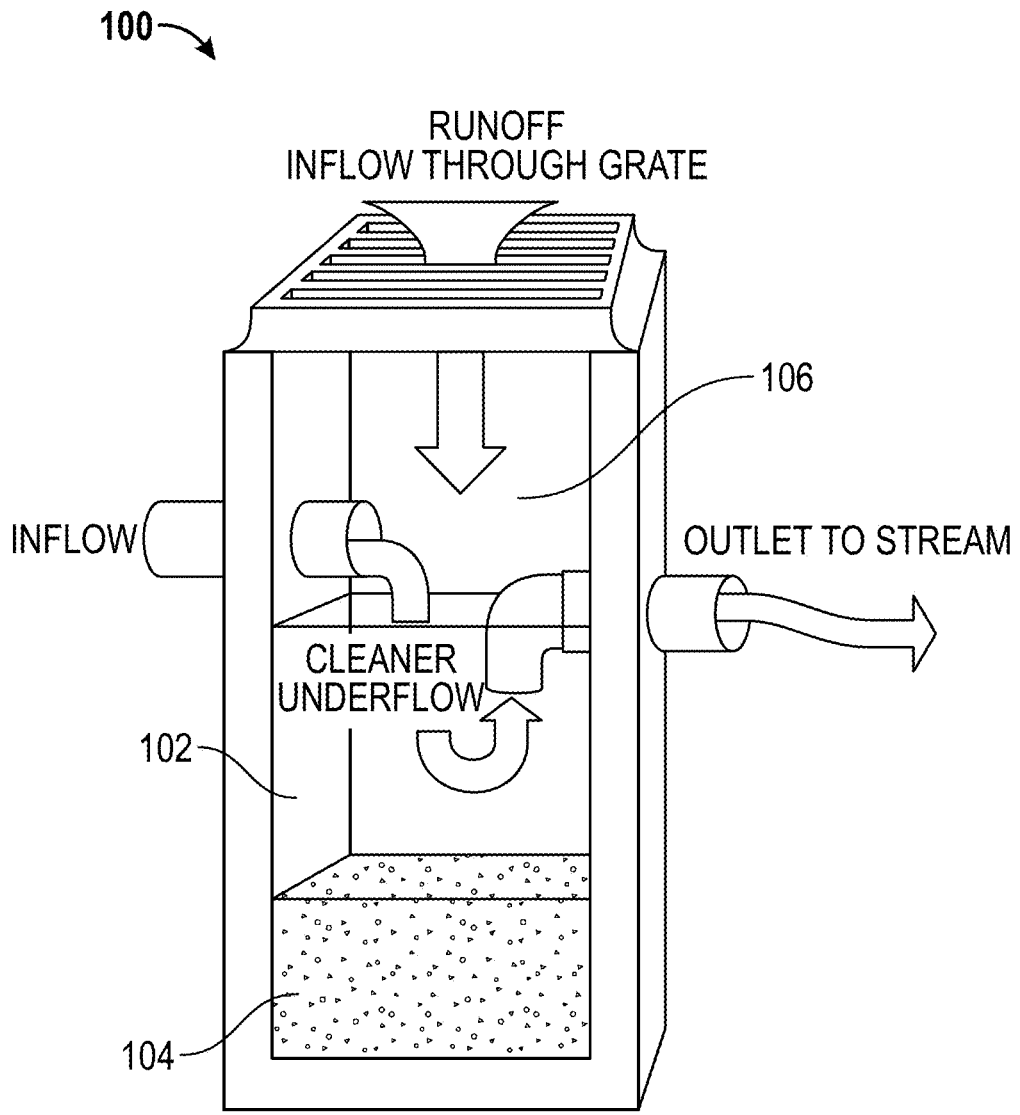
FIG. 1 is a cross-sectional view of an exemplary known storm water management technology.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

As described, current water quality standards and the NPDES were established in 1972 via the CWA. The CWA required an NPDES permit prior to the discharge of pollutants or water that once contained pollutants (recharged water), or that discharge would be considered illegal. For storm water management technology, prior methods of cleaning drain basins and treating waste water included collecting at least the majority of the entire volume of waste water and sediment via a vacuum. The entire volume is then transported to an off-site water treatment facility that has an NPDES permit and/or other permits required for waste water disposal and treatment. These prior methods have the disadvantages of incurring high transportation costs, having limited capacity/volume for storage of waste (thereby increasing the time required to clean storm water management technology), and an increasing risk of contaminated storm water spills into the environment.

The system, subsystems, and methods described herein are the result of the recognition of the disadvantages set forth above. Further, the development of the system, subsystems, and methods are the result of significant resources (e.g. time and money) spent for the preparation, development, and testing of a prototype of a mobile storm water management technology cleaning unit. The development and testing of the prototype required the application for the first NPDES permit assigned to a mobile storm water management technology cleaning unit. Significant testing of methods and equipment was performed to meet EPA water quality standards under the supervision of EPA regulators. EPA regulators may have doubted that such a mobile unit would work to sufficiently meet EPA standards with on-site treatment storm water concurrent with storm water management technology cleaning, and therefore, restricted testing to a few specific sites and closely oversaw all phases of testing of regenerated water for the presence of contaminants.

Described herein are systems, subsystems, and methods for servicing storm water management technology and, more specifically, two-phase extraction and waste water regeneration source systems and methods for servicing storm water management technologies. Further, the systems and methods described herein may include returning regenerated waste water to the point source.

The systems, subsystems, and methods for servicing storm water management technology described herein preferably are able to separate solids (sediment) from liquids (waste water) at the point source (the storm water management technology) using a two-phase extraction method. Further, by treating the waste water (using a waste water regeneration method) at the point source and returning the treated waste water (which can be considered "regenerated water") to the storm water management technology, the volume of liquids to be transported may be reduced by 99%. Reducing the transportation of waste water lowers the risk of exposure during transport. Further, reducing the transportation of waste water lowers the overall carbon footprint by reducing the need to transport off-site. In addition, since the regenerated water may be used for recharging and/or cleaning the storm water management technology, clean water may not require transport from the point source, further reducing transportation costs and carbon footprints.

Figure 2:
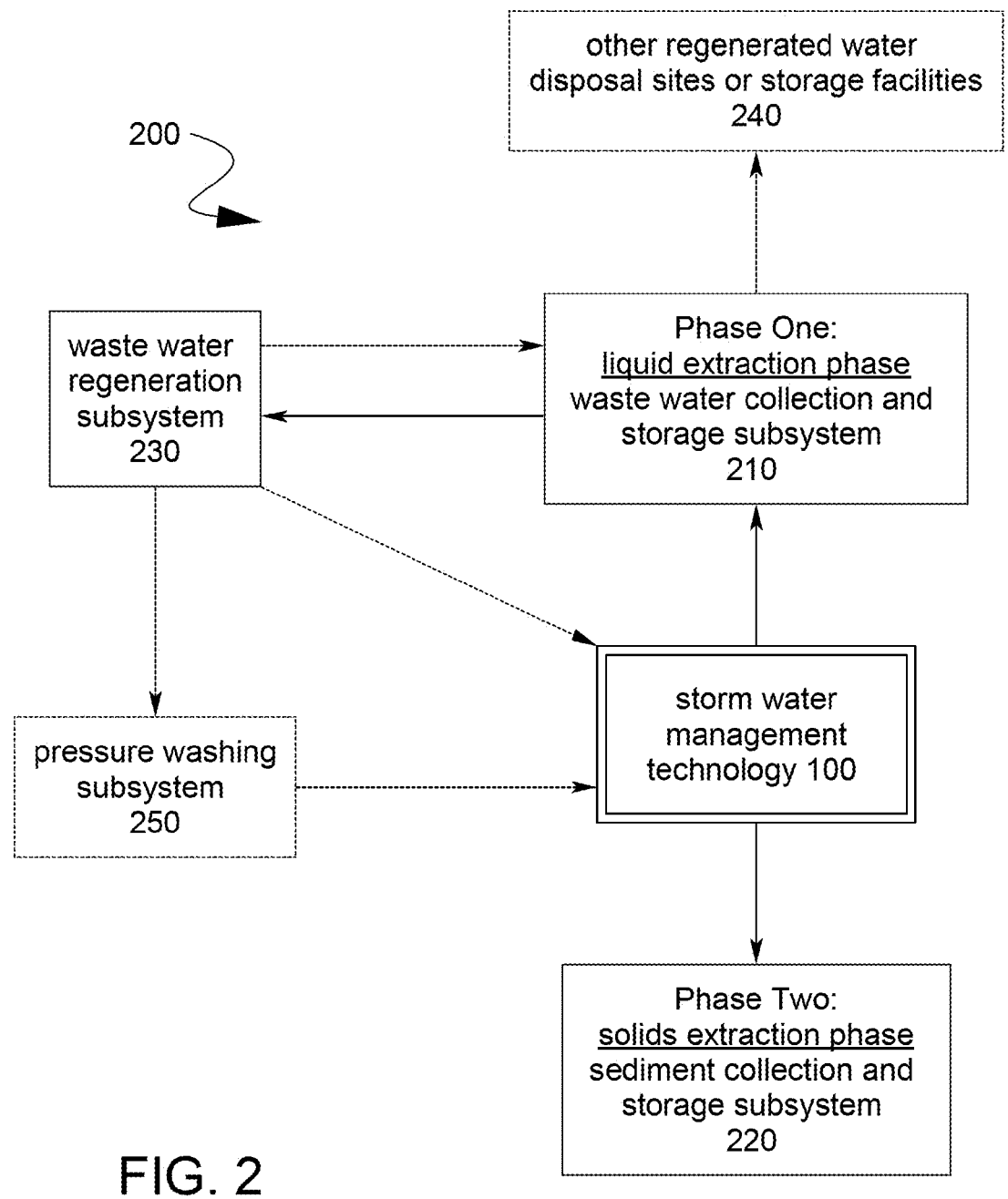
FIG. 2 is a generalized schematic view of an exemplary storm water management technology servicing system showing the interaction of various subsystems including the waste water collection and storage subsystem, the sediment collection and storage subsystem, and the waste water regeneration subsystem.

As shown in FIG. 2, the exemplary storm water management technology servicing system 200, can be divided into subsystems. This figure shows the broad concept of the interaction of the various exemplary subsystems. The waste water collection and storage subsystem 210 removes waste water from the point source 100 in phase one (the liquid extraction phase). The sediment collection and storage subsystem 220 removes sediment from the point source 100 in phase two (the solids extraction phase). Waste water from the waste water collection and storage subsystem 210 is preferably regenerated using a waste water regeneration subsystem 230 to become regenerated water. The regenerated water may optionally or alternatively be returned to the point source 100, cycled through or stored in the waste water collection and storage subsystem 210 (from which it may be removed to other regenerated water disposal sites or storage facilities 240), and/or used in a pressure washing subsystem 250 (that may ultimately be used to clean the point source 100).

Exemplary systems, subsystems, and methods for servicing storm water management technology may be better understood with reference to the drawings, but these waste water regeneration systems and waste water regeneration methods are not intended to be of a limiting nature.

Before describing the various exemplary systems, subsystems, and methods and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The phrase "storm water management technology" 100 (also referred to as "point source" 100) refers to technologies used to catch water runoff. Exemplary storm water management technology 100 include, but are not limited to, storm drains, catch basins, water vaults, storm filter vaults, oil/water vaults, detention ponds, drywells, underground injection control (UIC), harvest tanks, and/or sediment manholes for holding waste water and solid waste mixed with the waste water. FIG. 1 shows an exemplary point source 100 where storm water, pollutants, and debris are collected from an area, such as a parking lot. As shown, because of "gravity separation" (settling), the storm water, pollutants, and debris are divided into a top liquid portion (waste water 102) and a bottom solid portion (sediment 104). In phase one, at least the majority of the top liquid portion (waste water 102) is removed, leaving the bottom solid portion (sediment 104) within the basin 106 of the point source 100. In phase two, at least the majority of the bottom solid portion (sediment 104) is removed from the basin 106 of the point source 100.

The phrase "waste water regeneration method" describes processes designed to bring waste water to environmental quality (also called ambient quality). Such processes may be those used to treat urban runoff (storm water) and non-processed industrial waste water. Exemplary waste water regeneration methods may include one or more treatment steps including those selected from the following steps: filtration, liquid separation, gravity separation, screening, grit removal, micro screening, solids settling, chemical treating, polishing, and/or other known or yet to be discovered treatment steps for removing at least some pollutants from waste water. These treatment steps may be used multiple times (e.g. multi-filtration, multi-phase) and/or in combination with other treatment steps (e.g. filtration and polishing). The various exemplary "waste water regeneration systems" are capable of performing the waste water regeneration methods described herein. It should be noted that some or all of the waste water regeneration methods may be performed before the waste water enters the liquid settling storage container, while the waste water is in the liquid settling storage container (e.g. during recirculation), and/or after the waste water leaves the liquid settling storage container. The exemplary waste water regeneration systems shown and discussed herein use, for example, three filter units to filter liquid flowing out of the settling storage container, but any number of filter units could be used depending on their size, quality, ability to filter, desired speed, desired purification, and other relevant factors.

The phrase "regenerated water" refers to waste water that has been treated using the waste water regeneration method. Regenerated water meets all state and/or federal discharge requirements. Such regenerated water can be considered to be of environmental quality (also called ambient quality). Although technically the regenerated water may be potable, it is not necessarily potable unless that is the requirement for a particular locale.

The phrase "storage container" may be any vessel suitable for holding, storing, and/or treating (regenerating) liquids and/or solids. The systems and methods for servicing storm water management technology described herein use at least two storage containers: a liquid settling storage container (part of the waste water collection and storage subsystem 210) and a solids containment container (part of the sediment collection and storage subsystem 220). Each storage container may be a stand-alone container (e.g. tank) or may be a portion of a single, but divided vessel. For example, the liquid settling storage container may be a single storage container or may be one of a dual-compartmented vessel (e.g. a dual compartment steel design tank). Although only shown and described with a single liquid settling storage container and a single solids containment container, it should be noted that multiples of each type of container may be used.

Figure 8:
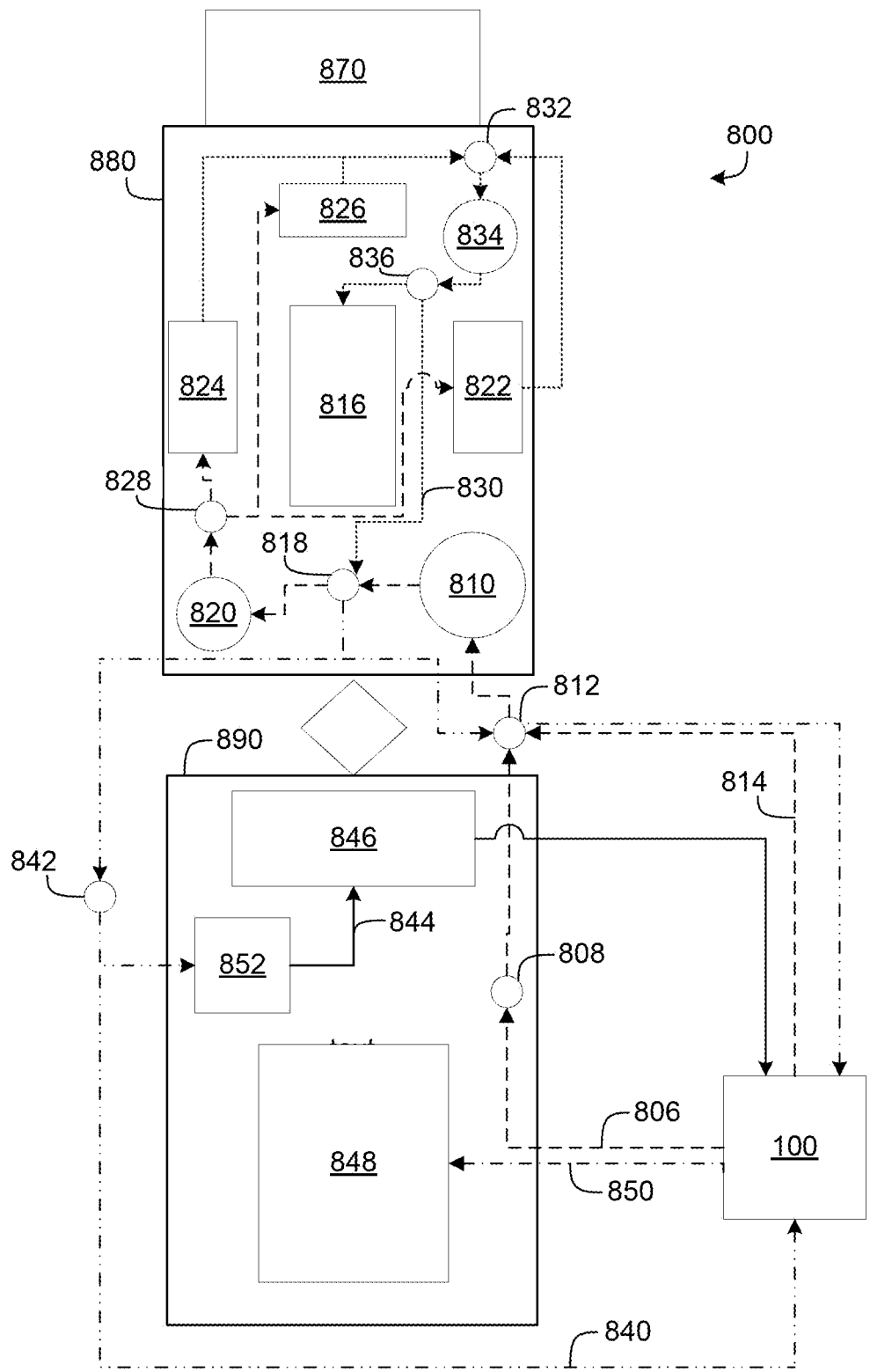
FIG. 8 is a schematic view of an exemplary layout of two-phase extraction and waste water regeneration systems implemented as a dual mount truck.
Figure 9:
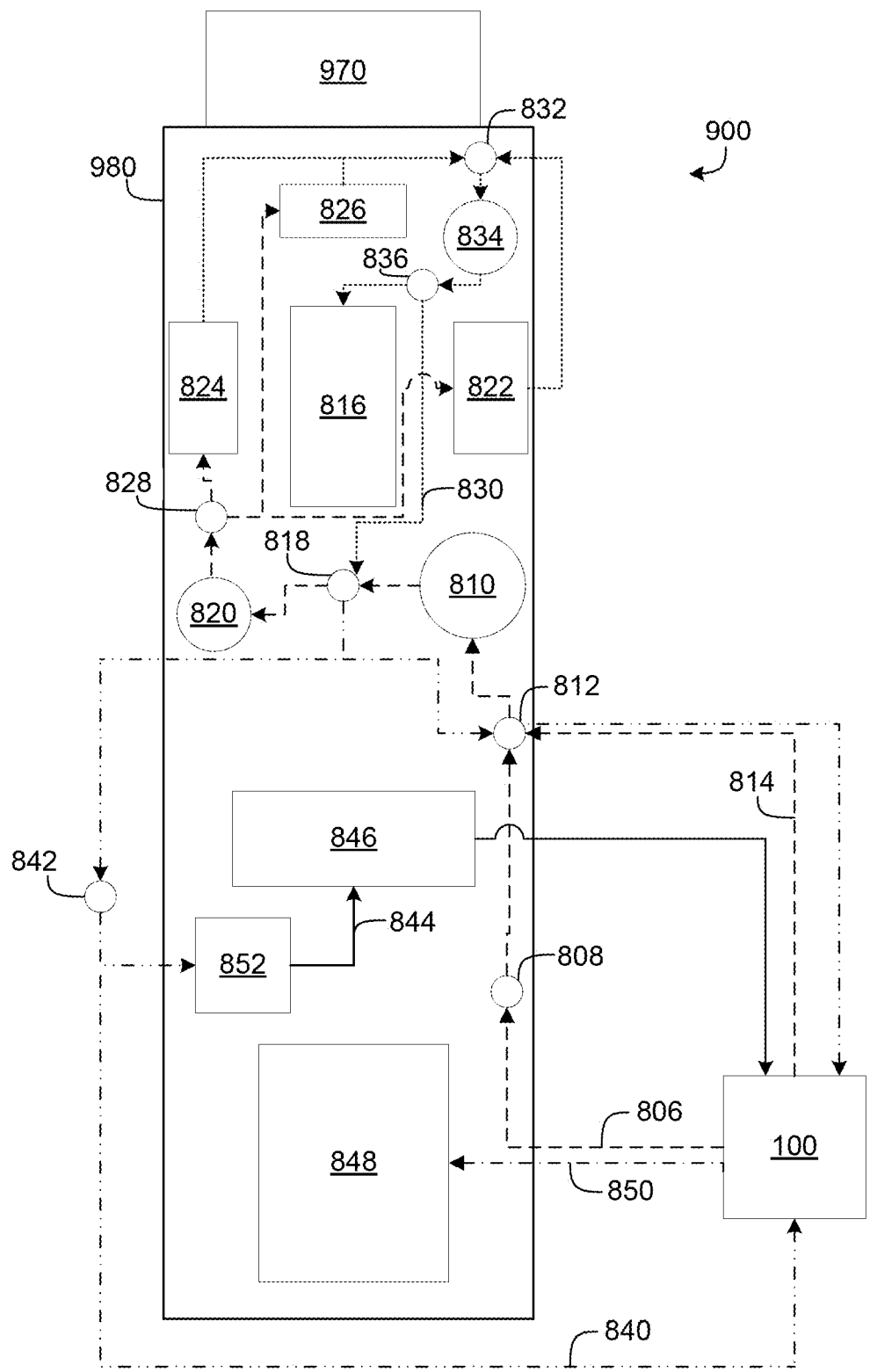
FIG. 9 is a schematic view of an exemplary layout of two-phase extraction and waste water regeneration systems implemented as a single truck.

The term "conduit" is meant to include any means for transferring including, but not limited to, tubes, pipes, lines, or transfer mechanisms known or yet to be discovered. The conduit may be rigid and/or flexible. FIGS. 8 and 9, for example, show exemplary systems using liquid conduits and solids conduits. The shown conduit systems are meant to be exemplary and variations are contemplated. For example, some variations would replace a single conduit with multiple conduits. Similarly, some variations would replace multiple conduits with single conduits. Additional conduits for alternative purposes may also be included in some variations. As shown in FIGS. 4, 6, and 7, exemplary variations of the conduit scheme may use a single main conduit that carries both liquids and solids to at least partially replace the distinct conduits shown in FIGS. 3 and 5.

The term "pump" is meant to include any means for causing movement (pushing or pulling) through a conduit. A pump may provide suction, vacuum, propulsion, positive or negative displacement, and/or any known or yet to be discovered means for causing movement through a conduit. As an example, an exemplary industrial vacuum may be the "pump" used for feeding the solids to the solids containment container. Exemplary pumps include powered centrifugal liquid pumps, vacuum pumps, blower motors, and/or other known or yet to be discovered means for causing movement through a conduit. Exemplary pumps may be powered using associated hydraulic motors and/or other known or yet to be discovered means for providing the power necessary to run the pumps.

The term "associated" is defined to mean integral or original, retrofitted, attached, connected (including functionally connected), positioned near, and/or accessible by.

Unless specifically stated otherwise, the terms "first," "second," and "third" are meant solely for purposes of designation and not for order or limitation. For example, the "first preferred exemplary waste water regeneration system" has no order relationship with the "second preferred exemplary waste water regeneration system."

Unless specifically stated otherwise, the term "exemplary" is meant to indicate an example, representative, and/or illustration of a type. The term "exemplary" does not necessarily mean the best or most desired of the type. For example, an "exemplary waste water regeneration system" is just one example of a waste water regeneration system, but other waste water regeneration systems could be just as desirable.

It should be noted that relative terms (e.g. primary and secondary) are meant to help in the understanding of the technology and are not meant to limit the scope of the invention. Similarly, the term "front" is meant to be relative to the term "back" and the term "top" is meant to be relative to the term "bottom."

The terms "may," "might," "can," and "could" are used to indicate alternatives and optional features and only should be construed as a limitation if specifically included in the claims. For example, the phrase "the waste water regeneration system may have a pressure washer system" indicates that the pressure washer system is optional. It should be noted that the various components, features, steps, or embodiments thereof are all "preferred" whether or not it is specifically indicated. Claims not including a specific limitation should not be construed to include that limitation.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

Two-Phase Extraction

The various exemplary systems and methods 300, 400, 500, 600, 700 (shown in FIGS. 3-7) for servicing storm water management technology described herein use at least two storage containers (at least one liquid settling storage container 304, 404, 504, 604, 704 and at least one solids containment container 308, 408, 508, 608, 708) to service (e.g. clean and/or recharge) point source 100. Extraction of the liquids 102 and solids 104 from the point source 100 to the appropriate container is performed in two phases that may be characterized as a two-phase extraction method. Further, FIGS. 3-7 show various exemplary configurations and/or implementations of inlet conduits, outlet conduits, filters, and pumps associated with the liquid settling storage containers 304, 404, 504, 604, 704 and the solids containment containers 308, 408, 508, 608, 708. The various exemplary systems and methods 300, 400, 500, 600, 700 demonstrate that the two-phase extraction method may be implemented with various configurations for a two-phase extraction system. Furthermore, the various systems and methods 300, 400, 500, 600, 700 are meant to be exemplary and it should be appreciated that two-phase extraction may be performed by various configurations of inlet conduits, outlet conduits, filters, pumps, liquid settling storage, containers, and solids containment containers. Further still, two-phase extraction may be performed by various configurations and types of inlet conduits, outlet conduits, filters, pumps, liquid settling storage, containers, and solids containment containers that are known or yet to be discovered.

Phase One—Liquid Extraction

In phase one, using the waste water collection and storage subsystem 210, liquids (waste water 102) are extracted from the point source 100 using at least one liquid inlet conduit and at least one appropriate pump (together referred to as the "liquid suction apparatus") and transferred to at least one liquid settling storage container (also referred to as "liquid storage container"). A relatively course grate or screening may be associated with the nozzle of the liquid conduit to discourage solids from entering the liquid conduit. The liquid suction apparatus is preferably coupled directly or indirectly to the liquid settling storage container.

Preferably, at a minimum, the waste water 102 above the settled sediment 104 will be removed during phase one. Further, preferably, the majority of liquids 102 in the point source 100 will be removed during phase one. Some preferred systems will be able to remove almost all of the waste water 102. The amount of liquid that can be removed and the rate of liquid removal will depend on specific features of the system (e.g. how powerful the pump is, the grate/screening, liquid density, capacity of the liquid settling storage container, and the skill of the operator). It should be noted, however, that the majority of the solids will remain at the point source 100 after phase one.

Exemplary pumps for feeding the liquid to the liquid settling storage container that may be used include a hydraulic powered centrifugal liquid pump and/or a vacuum line. A vacuum line may be particularly useful if the liquid settling storage container is of a dual compartment design because it may reduce or eliminate the need for centrifugal and/or other pumps, and provide a vacuum conduit for both phase one and phase two operations.

Figure 3:
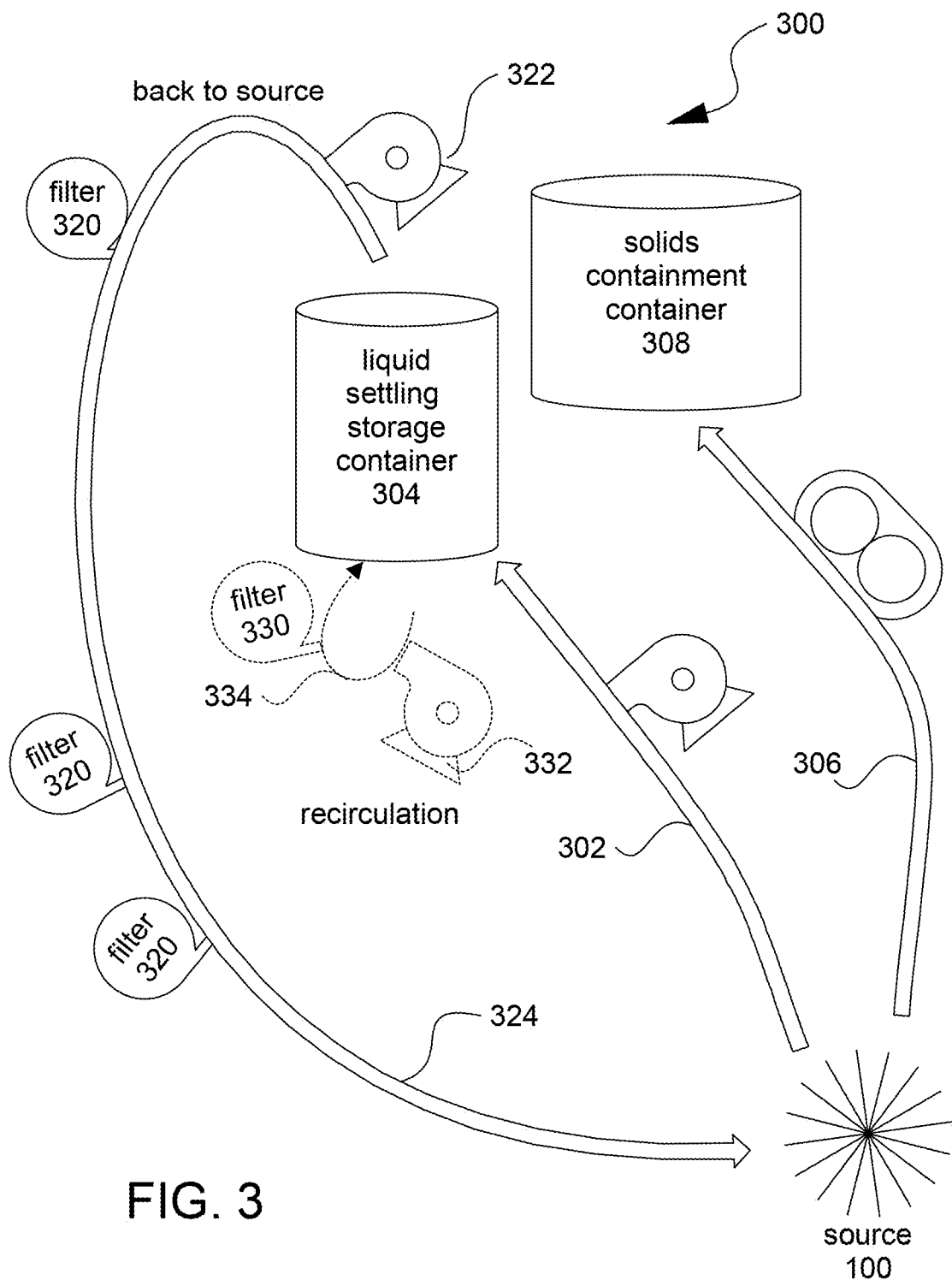
FIG. 3 is a schematic view of an exemplary first partial storm water management technology servicing system, the partial system having a distinct inlet conduit to the liquid settling storage container, a distinct inlet conduit to the solids containment container, and a distinct return conduit from the liquid settling storage container back to the point source.
Figure 4:
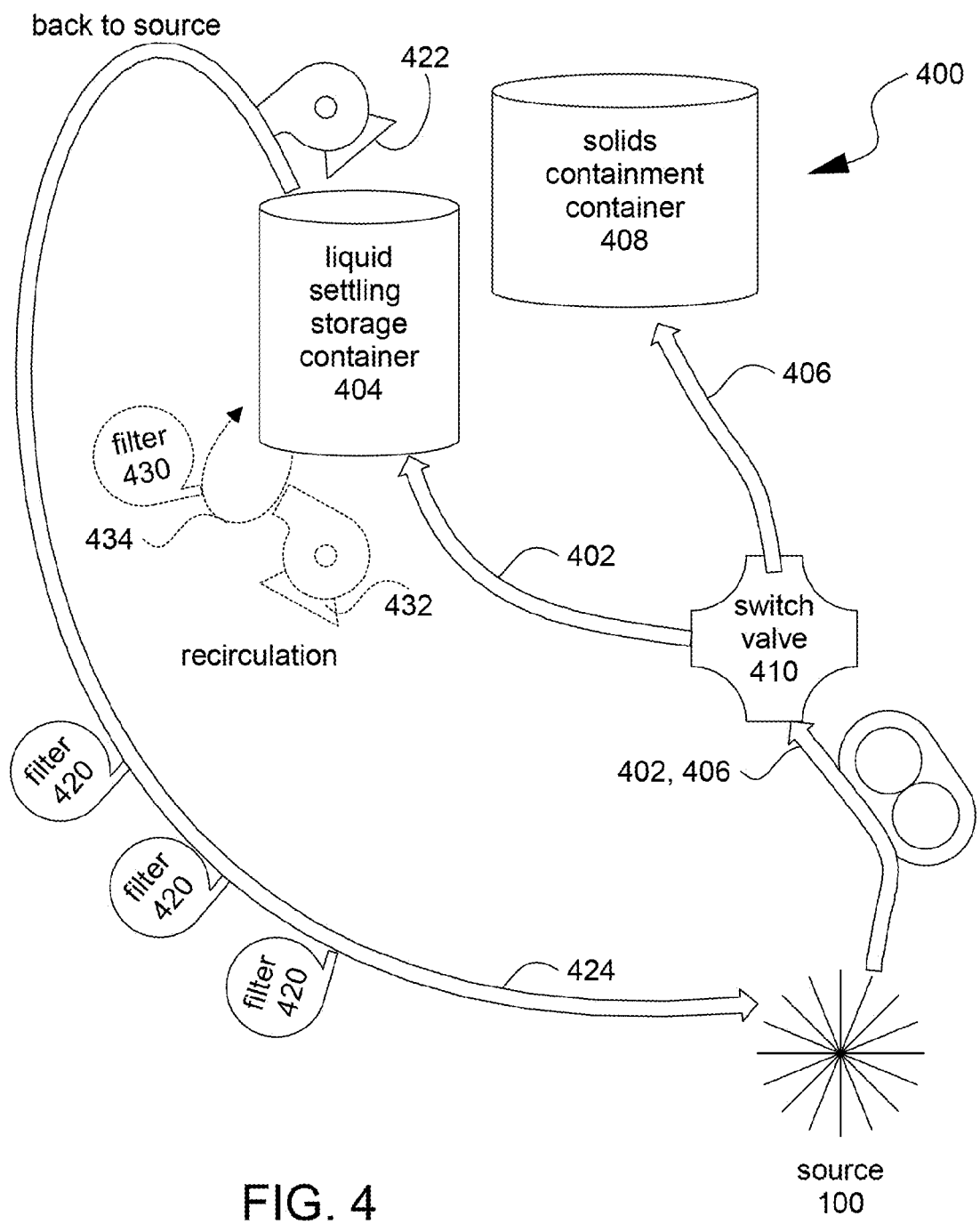
FIG. 4 is a schematic view of an exemplary second partial storm water management technology servicing system, the partial system having an at least partially shared inlet conduit to the liquid settling storage container and to the solids containment container, and a distinct return conduit from the liquid settling storage container back to the point source.
Figure 5:
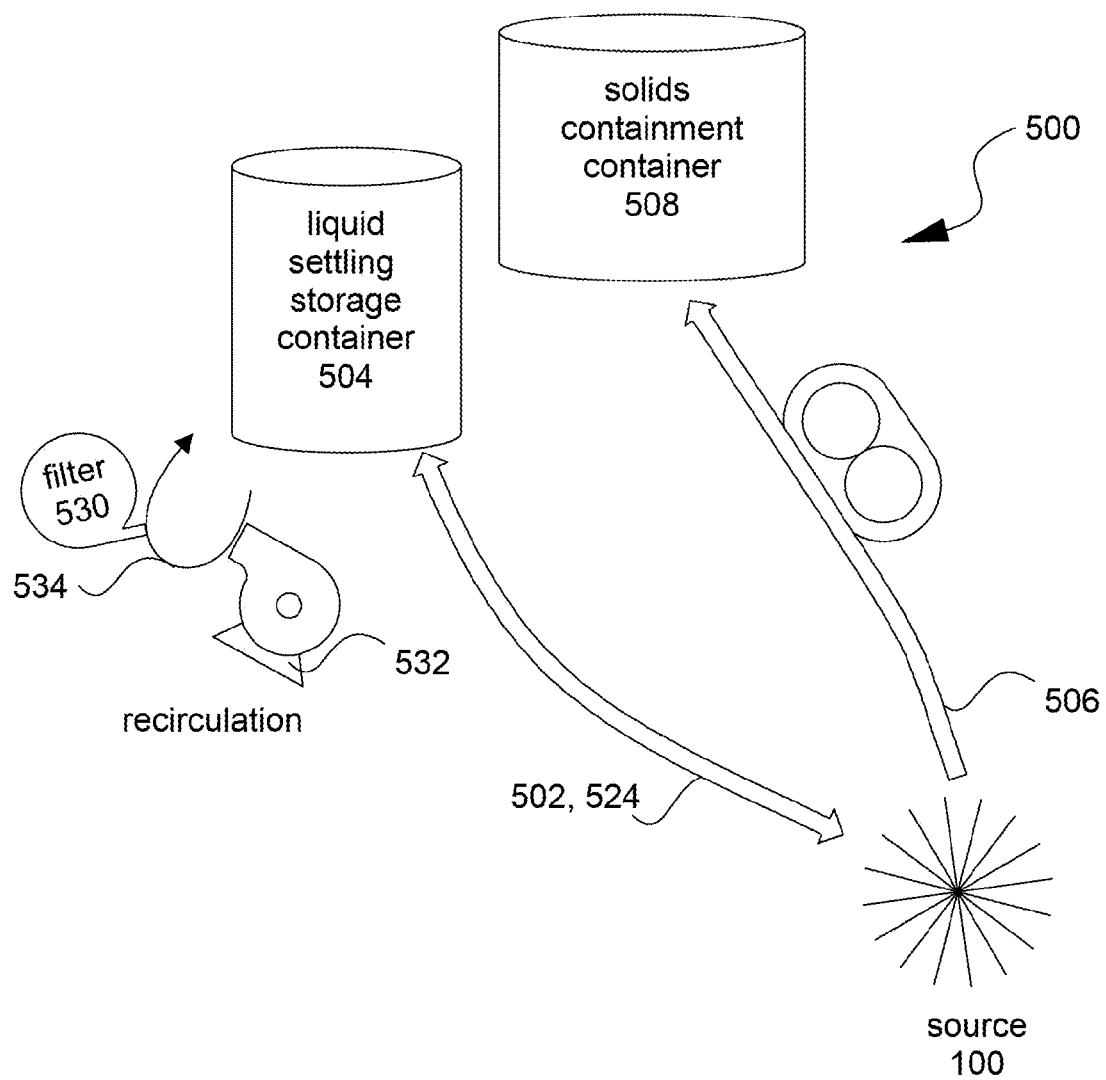
FIG. 5 is a schematic view of an exemplary third partial storm water management technology servicing system, the partial system having a two-way inlet/outlet conduit to/from the liquid settling storage container and a distinct inlet conduit to the solids containment container.
Figure 6:
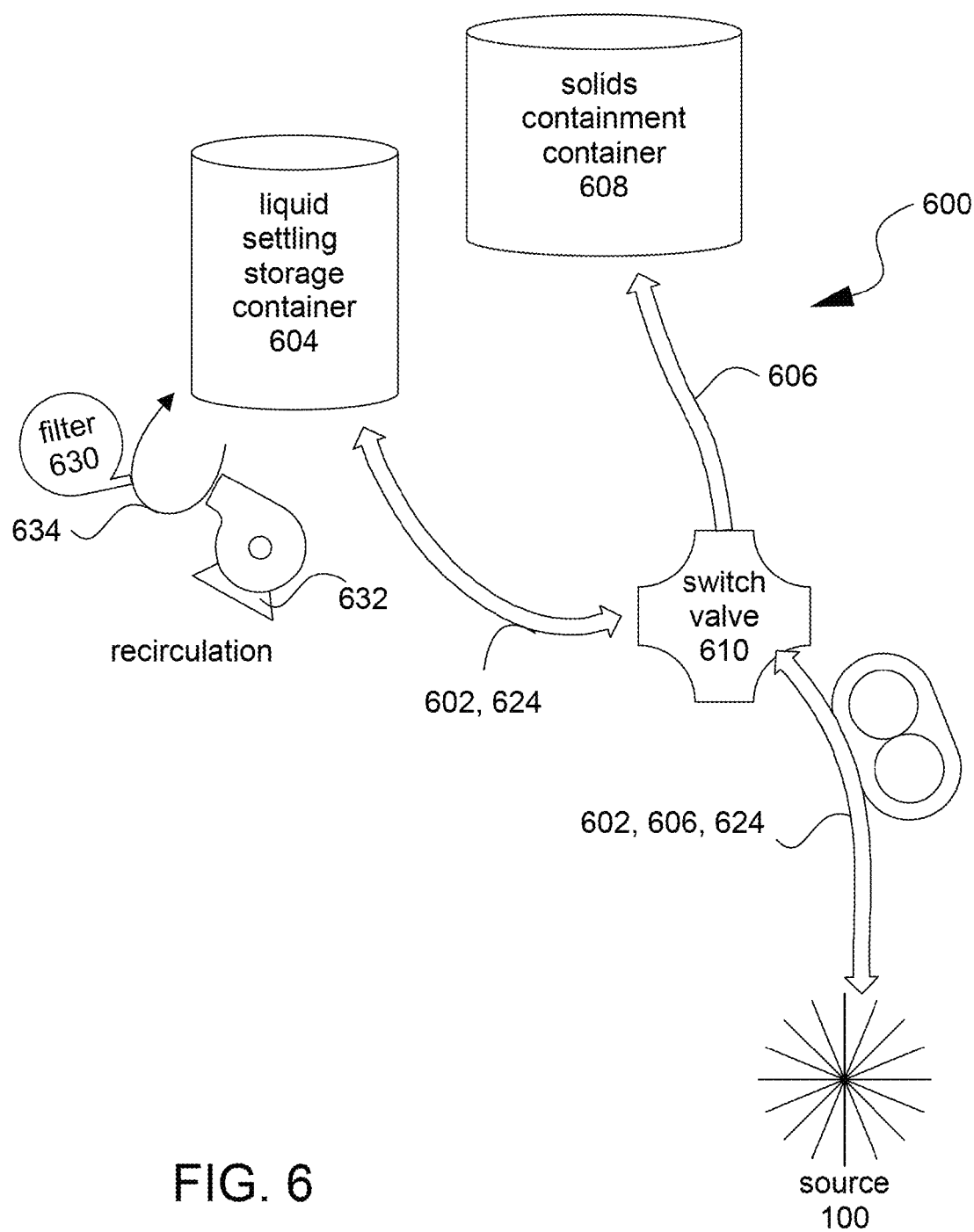
FIG. 6 is a schematic view of an exemplary fourth partial storm water management technology servicing system, the partial system having an at least partially shared inlet conduit to the liquid settling storage container and to the solids containment container, at least part of the inlet conduit being a two-way inlet/outlet conduit to/from the liquid settling storage container.
Figure 7:
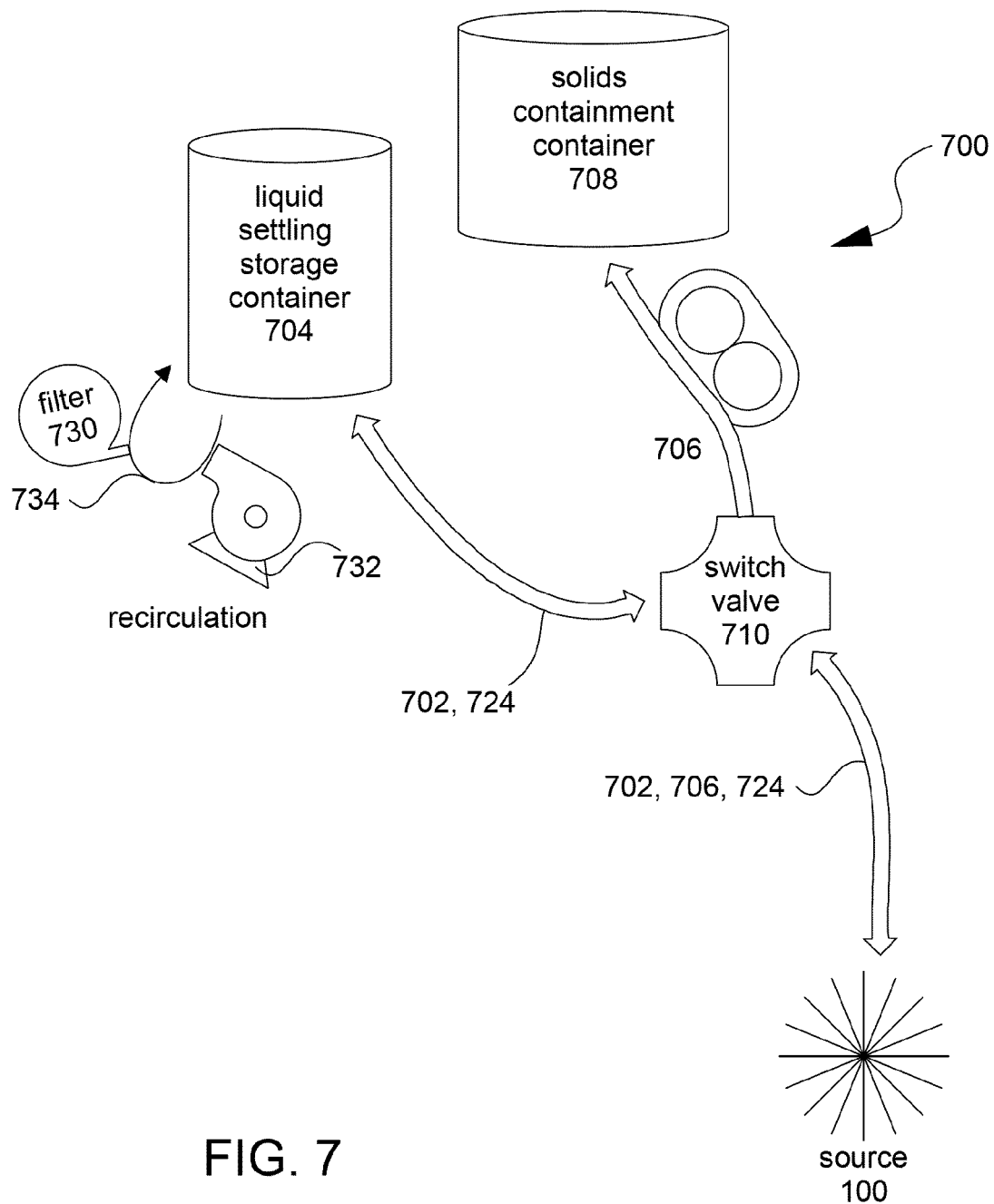
FIG. 7 is a schematic view of an exemplary fourth partial storm water management technology servicing system, the partial system having an at least partially shared inlet conduit to the liquid settling storage container and to the solids containment container, at least part of the inlet conduit being a two-way inlet/outlet conduit to/from the liquid settling storage container.

FIGS. 3-7 show various implementations of inlet conduits and liquid settling storage containers. Specifically, FIG. 3 shows the first exemplary system 300 including a distinct inlet conduit 302 to the liquid settling storage container 304. FIG. 4 shows the second exemplary system 400 including an at least partially shared inlet conduit 402 to the liquid settling storage container 404 (a switch valve and/or diversion valve 410 directing the liquids to the appropriate container). FIG. 5 shows the third exemplary system 500 including a two-way inlet/outlet conduit 502 to/from the liquid settling storage container 504. FIGS. 6 and 7 show the fourth exemplary system 600 and the fifth exemplary system 700, respectively. Each of these systems includes an at least partially shared inlet conduit 602 and 702 (and appropriate switch valves and/or diversion valves 610 and 710) to the liquid settling storage container 604 and 704, respectively.

Phase Two—Solids Extraction

In phase two, using the sediment collection and storage subsystem 220, solids (sediment 104) remaining after phase one are extracted from the point source 100 using at least one solids inlet conduit and at least one appropriate pump (together referred to as a "solids suction apparatus") and transferred to at least one solids containment container. Although referred to as a solids containment container, it is contemplated that some liquid may be removed along with the remaining solids and that comingled liquids may be transferred to the solids containment container. The solids suction apparatus is preferably coupled directly or indirectly to the solids containment container.

Preferably, at a minimum, at least some of the sediment 104 will be removed during phase two. Further, preferably, the majority of sediment 104 in the point source 100 will be removed during phase two. Some preferred systems will be able to remove almost all of the sediment 104. The amount of sediment that can be removed and the rate of sediment removal will depend on specific features of the system (e.g. how powerful the pump is, sediment density, capacity of the sediment storage container, and the skill of the operator). It should be noted, however, that the majority of the solids will preferably be removed from the point source 100 after phase two.

FIGS. 3-7 show various implementations of inlet conduits and solids containment containers. Specifically, FIG. 3 shows the first exemplary system 300 including a distinct inlet conduit 306 to the solids containment container 308. FIG. 4 shows the second exemplary system 400 including an at least partially shared inlet conduit 406 to the solids containment container 408 (a switch valve and/or diversion valve 410 directing the sediment to the appropriate container). FIG. 5 shows the third exemplary system 500 including a one-way inlet conduit 506 to the solids containment container 508. FIGS. 6 and 7 show the fourth exemplary system 600 and the fifth exemplary system 700, respectively. Each of these exemplary systems includes an at least partially shared inlet conduit 606 and 706 (and appropriate switch valves and/or diversion valves 610 and 710) to the solids containment container 608 and 708, respectively.

Waste Water Regeneration

One or more waste water regeneration methods (or treatment steps thereof) may be performed on the waste water 102 (using the waste water regeneration subsystem 230) to ultimately result in regenerated water (at least water of industrial use quality, and preferably, water of environmental quality and/or human consumption quality). Regeneration treatment steps may be performed before the waste water enters the liquid settling storage container (e.g. pretreatment—not shown), while the waste water is in the liquid settling storage container (e.g. during recirculation), and/or after the waste water leaves the liquid settling storage container. Regeneration treatment steps may be performed alone or in combination with other treatment steps and appropriate components would be used to perform these treatment steps. It should be noted that an additional "treatment step" might be performed within the liquid settling storage container. This internal treatment step may be as simple as solids settling within the liquid settling storage container. The "regenerated water" may be, for example, used at and/or returned to the point source 100, stored in the liquid settling tank, and/or removed to another site for use.

FIGS. 3 and 4 show filter treatment steps being performed "after" the transfer to the liquid settling storage container and, in fact, being performed as the waste water (or partially treated liquid) leaves the liquid settling storage container. As shown, regeneration treatment steps may be performed using at least one filter 320, 420, at least one pump 322, 422, and appropriate conduit(s) 324, 424. Exemplary treatment steps include filtration, liquid separation, gravity separation, screening, grit removal, micro screening, solids settling, chemical treating, polishing, and/or other known or yet to be discovered treatment steps for removing at least some pollutants from waste water. The shown filters may be any of a wide variety of filter media dependent on water quality standards for any particular state or region. Examples of waste water and/or contaminated water treatment systems are described in various references including U.S. Pat. No. 6,719,910 to Thiem et al., U.S. Pat. No. 7,001,519 to Linden et al., U.S. Pat. No. 7,025,887 to Kirts et al., U.S. Pat. No. 7,455,780 to Joyner et al., U.S. Pat. No. 8,318,021 to Armour, and U.S. Pat. No. 8,354,030 to Schuh, the disclosures of which are herein incorporated by reference.

As mentioned above, treatment steps may also be performed during recirculation using a recirculation subsystem (that may be part of the waste water regeneration subsystem 230). FIGS. 3-7 show components positioned such that a filtering treatment is performed during recirculation of fluids within the liquid settling storage container. The recirculation subsystem may include at least one filter 330, 430, 530, 630, 730, at least one pump 332, 432, 532, 632, 732, and appropriate conduit(s) 334, 434, 534, 634, 734. Treatment steps may be performed only during recirculation (without treatment steps being performed, for example, after the waste water leaves the liquid settling storage container) or in combination with treatment steps performed at other points (e.g. in combination with treatment steps being performed, for example, after the waste water leaves the liquid settling storage container). FIGS. 3 and 4 show the components for the treatment steps performed during the recirculation subsystem in phantom to indicate that they are optional.

Although not shown, pretreatment steps may also be performed (using components that may be part of the waste water regeneration subsystem 230) before the waste water enters the liquid settling storage container. The pretreatment steps may be performed alone or in combination with treatment steps performed during recirculation and/or treatment steps performed after the waste water leaves the liquid settling storage container.

Return of Regenerated Water

After the waste water 102 has been treated so as to become regenerated water, the regenerated water may be returned to the point source 100, cycled through or stored in the waste water collection and storage subsystem 210 (from which it may be removed to other regenerated water disposal sites or storage facilities 240), and/or used in a pressure washing subsystem 250 (that may ultimately be used to clean the point source 100). Because storm water management technology ultimately feed into the water of the state (all natural open and underground aquifer freshwater resources within the boundaries of a state), the regenerated water will meet all appropriate state and federal requirements for water quality standards.

In a first example, the regenerated water may be returned to the point source 100 for the purpose of "recharging." Recharging is the process of adding enough water to the storm water management technology so that proper liquid flow will occur. Without regenerated water, a mobile unit would have to carry its own supply of water for the specific purpose of recharging the storm water management technology.

In another example, regenerated water can be transported to a pressure washing subsystem (such as the pressure washing subsystem 250). The regenerated water may then be returned to the point source 100 as the liquid of a pressure washer. The regenerated water, therefore, assists in the cleaning of the point source 100. Without regenerated water, a mobile unit would have to carry its own supply of water for the specific purpose of pressure washing the storm water management technology.

FIGS. 3-7 show exemplary configurations for systems for returning regenerated water to the point source 100. FIGS. 3 and 4 show a distinct return conduit 324, 424, respectively, from the liquid settling storage container 304, 404 back to the point source 100. FIGS. 5-7 show a return conduit 524, 624, 724 as part of a two-way inlet/outlet conduit (combined with an inlet conduit 502, 602, 702) to/from the liquid settling storage container 504, 604, 704. It should be noted that intermediary valves 410, 610, 710, tanks, and/or pressure washing systems may be used. Accordingly, the return conduit may take the regenerated water to a pressure washing storage tank from which a pressure washer draws fluid for pressure washing the point source 100. The pressure washing storage tank and the pressure washer may be components of the pressure washing subsystem 250.

Mobile Implementation

It should be noted that preferred systems and methods for servicing point source 100 may be implemented such that they are mobile. Accordingly, the various components may be mounted on a flatbed truck or equal weight-bearing vehicle registered for transportation. For some implementations, a separate trailer may be used in combination with the main vehicle to provide additional surface area. The motor, battery, and/or other power sources of the vehicle may be used to power the system, to provide auxiliary power to the system, and/or to provide back-up power to the system.

Figure 10:
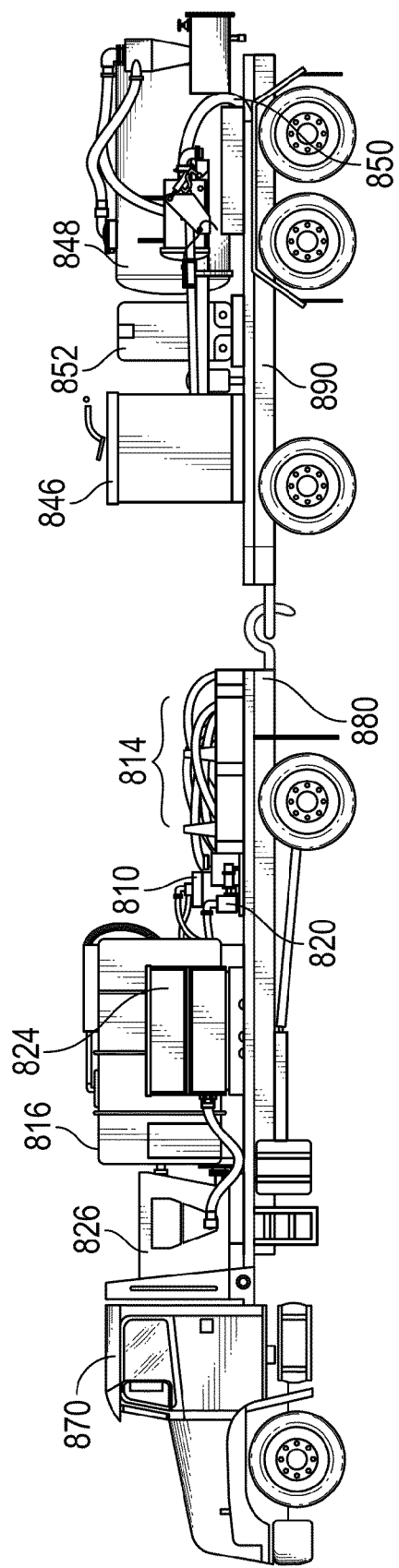
FIG. 10 is a first side view of an exemplary two-phase extraction and waste water regeneration systems implemented as a dual mount truck.
Figure 11:
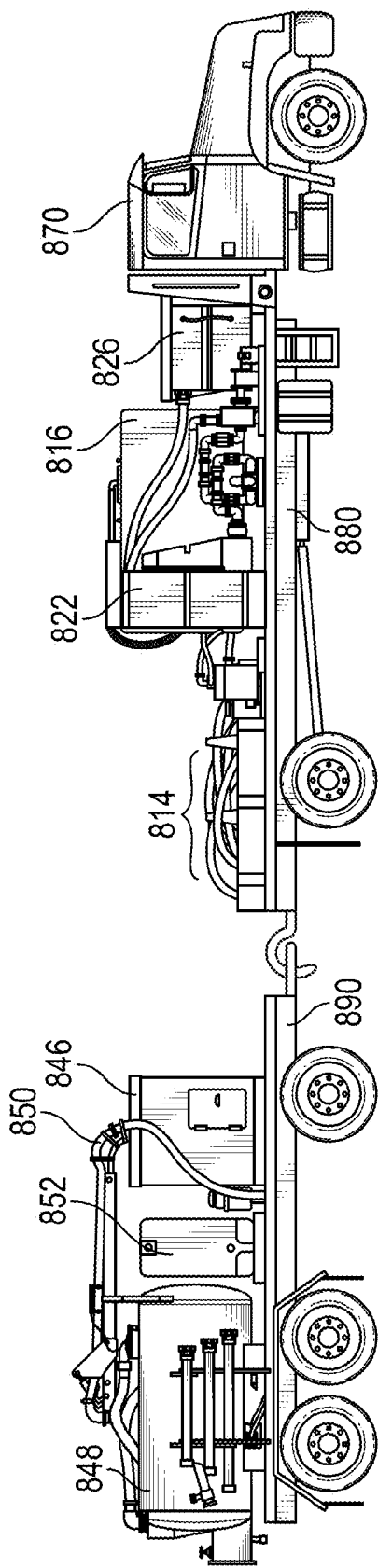
FIG. 11 is a second side view of the exemplary two-phase extraction and waste water regeneration systems implemented as a dual mount truck.
Figure 12:
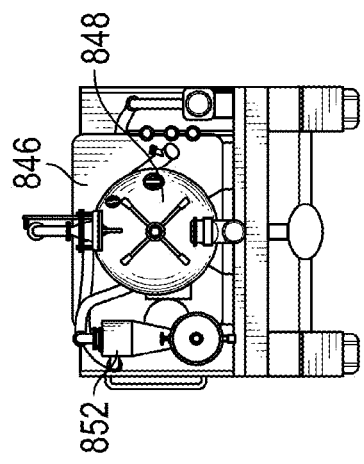
FIG. 12 is a rear view of the exemplary two-phase extraction and waste water regeneration systems implemented as a dual mount truck.

FIGS. 8 and 9 show exemplary plan view layouts of two-phase extraction and waste water regeneration systems. As shown in FIG. 8, the system and method may use a combination truck and trailer (also referred to as a dual mount truck) 800 (liquid extraction and filtration) and trailer 802 (solids extraction) in combination. As an alternative, as shown in FIG. 9, the components of the system may be combined onto a single truck 900 (e.g. using a single vessel with two separate containers and a dual-phase pump) such that the two-phase extraction method, waste water regeneration method, and the return to point source 100 are implemented using a single mount truck design. FIGS. 10-12 show alternate graphical views of an exemplary vehicle including the components shown in FIG. 8 (with a single truck implementation of FIG. 9 using similar components, but arranged in a different, more compact manner).

As an example, in a mobile implementation of the present system and method, power for operating the pumps in phase one and/or phase two may be supplied by the drive train (transmission) of the truck unit utilizing a Power Take Off (PTO) system. If some or all of the power did not or could not be supplied by the vehicle, power for operating one or more of the pumps in phase one and/or phase two may be supplied by a battery, a secondary engine, an external power source, and/or any other power source known or yet to be discovered. For example, if the system is not implemented in conjunction with a vehicle (such as the system being mounted on a trailer or the system being a non-mobile system), power would be supplied by a battery, a secondary engine, and/or an external power source. In another example, if the PTO system could not provide enough power to operate all of the pumps and/or the pressure washer, additional power may be supplied by a battery, a secondary engine, and/or an external power source.

Description of FIGS. 8 and 9

FIGS. 8 and 9 show exemplary systems for servicing storm water management technology (such as point source 100) for performing exemplary two-phase extraction, waste water regeneration, and return to point source methods as described herein. For exemplary purposes, these systems are shown as being mobile systems. FIG. 8 shows a plan view of a first exemplary vehicle 800 associated with a two-phase extraction and waste water regeneration system. The first exemplary vehicle 800 includes a truck cab 870, a flat bed 880, and a trailer 890. FIG. 9 shows a plan view of a second exemplary vehicle 900 associated with a two-phase extraction and waste water regeneration system. The second exemplary vehicle 900 includes a truck cab 970 with a flat bed 980.

During servicing, the exemplary vehicle may be parked proximal to the storm water management technology (point source 100) and a conduit (vacuum line) is inserted into the point source 100. The conduit (vacuum line) may be a suction and return flexible line with a rigid stinger (rigid portion of conduit associated with the flexible line) and may include a screen head assembly for liquid extraction and return of filtered liquids to the original point source 100.

During phase one of servicing (implementation of the waste water collection and storage subsystem), a conduit line (vacuum line) is inserted into a storm drain at a level that is above the surface of the sediment. The conduit is fluidly coupled to the inlet line system 806 (shown in even broken lines). The inlet line system may include a ball valve 808 to regulate pump priming for fluid pump 810, which may be a sump pump. The inlet line system 806 further includes a valve 812 downstream from the ball valve 808. The valve 812 may allow for alternate operation, for suctioning, and/or for returning liquids back to the point source 100. Alternatively, waste water may be pumped through a separate line 814 bypassing the ball valve 808 and delivering waste water directly to the valve 812. Waste water may be delivered via one or both of the inlet lines to fluid pump 810. As shown, the fluid pump 810 is mounted to a rear portion of a truck bed. In alternate examples, the fluid pump 810 may be mounted to the truck bed at another location or may be mounted to a trailer bed.

During waste water regeneration (implementation of the waste water regeneration subsystem), the fluid pump 810 may feed waste water to the filter system (shown as filter units 822, 824, 826) or may bypass the filter system and feed waste water directly to a liquid settling storage container 816. In the present example, the liquid settling tank is a 1,000 gallon tank, however, it should be appreciated that the liquid settling tank may have a lesser or a greater volume.

The shown valve manifold 818 regulates inlet to the liquid settling storage container 816 and/or to the fluid pump 820 (which is a filter pump). In the present example, the fluid pump 820 delivers waste water to each of filter units 822, 824, 826 mounted at a location proximal to the truck cab. Flow of waste water from the fluid pump 820 to the filter units 822, 824, 826 is regulated by a control valve manifold 828. In alternate examples, the fluid pump 820 may deliver waste water to more or fewer filter units, filter units may be associated in a successive order, and/or filter units may be mounted at alternative locations. Further, the fluid pump 820 is shown as located at a rear portion of the truck bed, but may alternatively be mounted in a different location of the truck bed or on the trailer.

After passing through filter units 822, 824, 826, filtered water enters into the recirculation or filter line system 830 (represented by dotted lines). An outlet flow control valve manifold 832 may regulate the flow of filtered water to a fluid pump 834. The fluid pump 834 then may pump filtered water to the liquid settling storage container 816 and/or the valve manifold 818. A valve 836 may regulate the flow of filtered water to either of the liquid settling storage container 816 or the valve manifold 818. Filtered water delivered to the liquid settling storage container 816 may be stored and/or used at a later time (as described herein). Each of fluid pumps 810, 820, 834 may be powered by a hydraulic manifold 838 coupled to a power source (not shown). It should be appreciated that in alternate exemplary systems for servicing storm water management technology, the fluid pumps may optionally or alternatively be powered by a different power source (as described herein).

Uneven broken lines with double dots represent a return line system 840. Via the return line system 840, filtered water may be delivered back to the point source 100 through the valve 812 for regenerating the point source 100. Alternatively, filtered water may be delivered back to the point source 100 through a bleed valve 842 for recharging and/or cleaning the point source 100. More specifically, filtered water may be delivered directly to the point source 100 via bleed valve 842, and optionally, filtered water may be delivered to a pressure washer (PW) tank 852 via bleed valve 842. A pressure washer line system 844 is represented by solid lines. A vacuum engine drive may be coupled to the PW tank 852. The pressure washer subsystem may be used to pressure wash the point source 100. The pressure washer subsystem may be powered by a vacuum engine drive. The pressure washer and the vacuum engine may be housed by housing 846. In the present examples, the pressure washer subsystem is located on a trailer attached to the truck at a location that is proximal to the truck. In alternate examples, the pressure washer subsystem may be mounted to the truck bed or a different location on the trailer, and may be powered by a different power source.

In the present examples, a solids containment container 848 (also referred to as a solids tank) is also provided on the attached trailer. The solids containment container may be a pre-fabricated vacuum tank for vacuuming solid waste out of the point source 100. The solids containment container may have a capacity of 800 gallons, however, it should be appreciated that in alternate systems the solids containment container 848 may have a greater or lesser capacity. During phase two (implementation of the sediment collecting and storing subsystem), a conduit 850 (vacuum line), shown in uneven broken line with a single dot, is inserted into the storm drain to remove solid waste from the point source 100. The solid waste is preferably stored in the solids containment container and is transported off-site for treatment and/or disposal. In alternate embodiments, the solids containment container 848 may be mounted to the truck bed and/or may be coupled to the liquid settling storage container, forming a single (integral) tank with two separate holding containers (compartments) for solid and liquid waste.

As stated above, FIG. 9 shows a plan view of second exemplary vehicle 900 associated with a two-phase extraction and waste water regeneration system, the second exemplary vehicle including a truck cab 970 with a flat bed 980.

The vehicle 900 includes the same numbered components as vehicle 800, described above, however, all of the components are mounted onto the flat bed 980, eliminating the need for a trailer.

FIGS. 10-12 include right side, left side, and rear views of the first exemplary vehicle 800.

Storm Drain (Storm Water Technology) Cleaning

Figure 13:
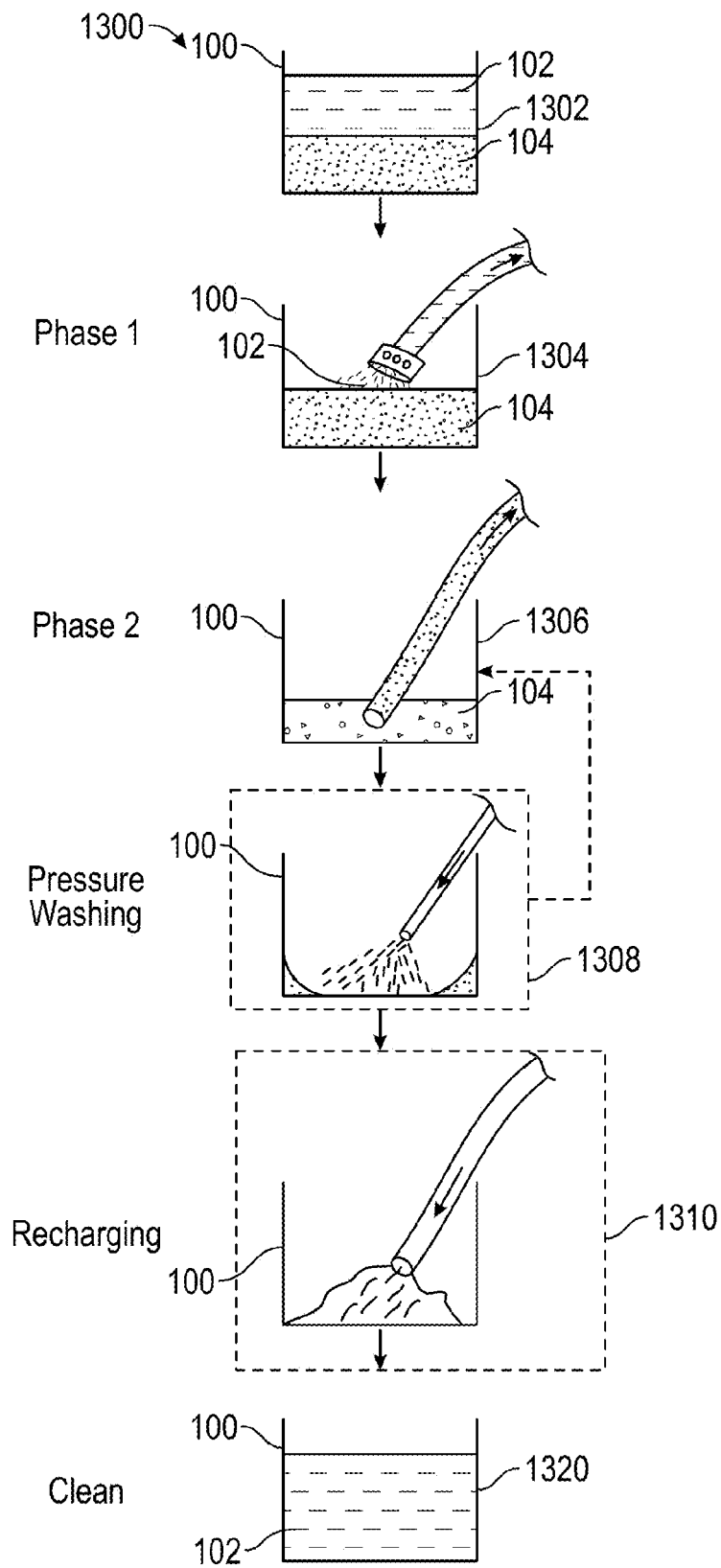
FIG. 13 is a graphical flow chart of an exemplary two-phase waste water extraction and regeneration method including an initial dirty state, phase one, phase two, pressure washing, recharging, and a final clean state.

FIG. 13 graphically shows an exemplary two-phase waste water extraction and regeneration method 1300 that may occur at a point source 100 (shown as a storm drain). This figure demonstrates how the storm drain may go from a "dirty" state (containing an unacceptable amount of sediment) to a "clean" state (containing little or no sediment) using the two-phase waste water extraction and regeneration method 1300.

At step 1302, a storm drain has collected an exemplary unacceptable amount of sediment such that it requires cleaning. An unacceptable amount of sediment may be an amount that disrupts optimal water flow through the storm drain inlet and outlet. An unacceptable amount of sediment may be an amount that accumulates after a predetermined time period (regular cleaning intervals or seasonal cleaning).

At step 1304, phase one of the exemplary two-phase waste water extraction and regeneration method 1300 is performed by the waste water collection and storage subsystem 210. During phase one, a liquid suction apparatus (shown as having an exemplary relatively course grate or screen head assembly) is inserted into the storm drain at a level that is above the surface of the sediment 104 and at least partially below the surface of the liquid waste water 102. Liquid waste water 102 is then suctioned and/or vacuumed out of the storm drain and collected in at least one liquid storage settling container. Preferably, at least the majority of liquid waste water is removed from the storm drain.

At step 1306, phase two of the exemplary two-phase waste water extraction and regeneration method 1300 is performed by the sediment collection and storage subsystem 220. During phase two, a solids suction apparatus is inserted into the storm drain a level below the surface of the sediment 104. Sediment 104 is then at least partially suctioned and/or vacuumed out of the storm drain and collected in at least one solids containment container. Preferably, at least the majority of sediment is removed from the storm drain.

Optionally (shown boxed in even broken lines representing phantom lines), at step 1308, the storm drain may be pressure washed to remove any remaining sediment that adheres to the sides and/or bottom surface of the storm drain. Water used for pressure washing may be regenerated storm water that has been regenerated by the waste water regeneration subsystem 230. Alternatively, the water used for pressure washing may come from a separate water source. If pressure washing is performed, phase two (step 1306) may be repeated to vacuum and/or suction out any remaining sediment 104 from the storm drain. If a significant amount of water is used for the pressure washing and there is time to allow the sediment to settle to the bottom, both phase one and phase two (step 1304 and step 1306) may be repeated.

At step 1310, the storm drain is "recharged," where water is added back to the storm drain. Preferably, regenerated waste water is used for recharging; however, an alternate source of water may be used for recharging. The storm drain is filled to a level that allows for optimal flow through the storm drain inlet and outlet, resulting in a clean storm drain in step 1320. When the storm drain is returned to a clean state optimal water flow may be restored to the storm water management technology.

System Control

The steps, actions, and/or functions of the two-phase extraction and waste water regeneration methods may be manually controlled and operated, or at least partially manually controlled and operated.

The steps, actions, and/or functions of the two-phase extraction and waste water regeneration methods may be automatically controlled and operated (e.g. using computer controls), or at least partially automatically controlled and operated. For example, the steps, actions, and/or functions of the waste water regeneration methods may be controlled using one or more computers that are controlled by one or more programs (or subprograms thereof). The computers, in turn, control the exemplary waste water regeneration subsystems or components thereof to perform the steps, actions, and/or functions associated therewith. The computers may have associated hardware, software, and/or firmware (a variation, subset, or hybrid of hardware and/or software). The term "hardware" includes at least one "processing unit," "processor," "computer," "programmable apparatus," and/or other known or yet to be discovered devices capable of executing instructions or steps. The term "software" includes at least one "program," "subprogram," "series of instructions," or hardware instructions or hardware-readable program code known or yet to be discovered. Software may be loaded onto hardware (or firmware) to produce a machine, such that the software executes on the hardware to create structures for implementing the functions described herein. Further, the software may be loaded onto the hardware (or firmware) so as to direct the various exemplary components of the waste water regeneration systems to function in a particular manner described herein or to perform a series of operational steps as described herein. The phrase "loaded onto the hardware" also includes being loaded into memory associated with or accessible by the hardware. The term "memory" is defined to include any type of hardware (or other technology)-readable media (also referred to as machine-readable storage medium) including, but not limited to, attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other storage media known or yet to be discovered. Depending on its purpose, the memory may be transitory and/or non-transitory. Appropriate "communications," "signals," and/or "transmissions" (which include various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the system (the system including, for example, hardware systems and subsystems, and memory) would be used as appropriate to facilitate controls and communications.

Comparison with Known Prior Art

As set forth in the Background, Vactor® trucks collect the combined waste water and sediment at the source of collection (the point source 100). Vactor trucks have no ability to separate liquids from solids at the source of collection. This means that Vactor trucks must transport the collection (that is up to 99% liquids) off-site, which has numerous problems associated therewith. First, transporting liquids can present a safety hazard and may result in increased liability caused by, for example, extra time on the road and/or the possibility that the collection will leak. Second, the additional weight means that Vactor trucks consume larger quantities of fossil fuels creating a larger carbon footprint. Third, Vactor trucks must transport water (for recharging) to the source of collection that, again, adds additional weight resulting in the consumption of larger quantities of fossil fuels. Fourth, transporting the collection off-site increases costs (e.g. increased fuel consumption and waste disposal costs). These and other problems make the system described herein particularly attractive.

One of the unique aspects of the present invention is the two-phase extraction in which the majority of the liquids (waste water) are extracted from the point source 100 and then, after the liquid extraction, the solids are extracted. If all the liquids and solids are extracted together as it is in prior art, waste water regeneration would be substantially more time consuming, if at all possible. As described, while the solids are being extracted, the waste water can be regenerated (treated) so that it is available for returning to the point source 100.

Miscellaneous:

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

The methods disclosed herein include one or more steps, actions, and/or functions for achieving the described actions and results. The method steps, actions, and/or functions may be interchanged with one another without departing from the scope of the present invention. In other words, unless a specific order of steps, actions, and/or functions is required for proper operation of the exemplary waste water regeneration systems, the order and/or use of specific steps, actions, and/or functions may be modified without departing from the scope of the present invention.

It should be noted that there are standards set by both federal and state regulatory agencies. One relevant regulation is the discharge limits set by the National Pollutant Discharge Elimination System (NPDES). The methods and systems described herein are fully compliant with these and other known regulations.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following numbered claims are intended to cover all of the generic and specific features of the invention herein described and all statements of the scope of the invention that, as a matter of language, might be said to fall there between.

What is claimed is:

1. A storm water management technology servicing system, said storm water management technology having a gravity separated top liquid waste water portion and a bottom solid sediment portion, said system comprising:
    (a) a waste water collection and storage subsystem for removing waste water from said top liquid waste water portion of said storm water management technology and leaving sediment within said storm water management technology, said waste water collection and storage subsystem including at least one liquid storage container for collecting and storing said waste water;
    (b) a sediment collection and storage subsystem for removing sediment from said bottom solid sediment portion of said storm water management technology, said sediment collection and storage subsystem including at least one solids containment container for collecting and storing said sediment; and
    (c) a recirculation subsystem including at least one filter, said waste water recirculating from said liquid settling storage container, through said at least one filter, and back to said liquid settling storage container;
    (d) wherein said waste water in said at least one liquid storage container is separated from said sediment in said at least one solids containment container.

2. The system of claim 1, said system further comprising a waste water regeneration subsystem for at least partially regenerating said waste water from said waste water collection and storage subsystem to create regenerated water, said regenerated water returnable to said storm water management technology.

3. The system of claim 1, said system further comprising a waste water regeneration subsystem for at least partially regenerating said waste water from said waste water collection and storage subsystem to create regenerated water, said regenerated water returnable to a regenerated water disposal site.

4. The system of claim 1 further comprising a pressure washing subsystem for pressure washing said storm water management technology.

5. The system of claim 1 further comprising:
    (a) a waste water regeneration subsystem for at least partially regenerating said waste water from said waste water collection and storage subsystem to create regenerated water;
    (b) a pressure washing subsystem for pressure washing said storm water management technology, said pressure washing subsystem using said regenerated water to pressure wash said storm water management technology.

6. The system of claim 1, said waste water collection and storage subsystem including at least one liquid suction apparatus, said waste water being transferrable from said storm water management technology to said at least one liquid storage container via said at least one liquid suction apparatus.

7. The system of claim 1, said sediment collection and storage subsystem including at least one solids suction apparatus, said waste water being transferrable from said storm water management technology to said at least one solids containment container via said at least one solids suction apparatus.

8. The system of claim 1, said system further comprising a waste water regeneration subsystem for at least partially regenerating said waste water from said waste water collection and storage subsystem to create regenerated water, said waste water regeneration subsystem for performing at least one treatment step to create said regenerated water.

9. The system of claim 1, said waste water collection and storage subsystem further including an inlet conduit to said at least one liquid storage container, said sediment collection and storage subsystem further including an inlet conduit to said at least one solids containment container, said inlet conduit to said at least one liquid storage container being distinct from said inlet conduit to said at least one solids containment container.

10. The system of claim 1, said system further comprising a switch valve, said waste water collection and storage subsystem further including an at least partially shared inlet conduit to said at least one liquid storage container and to said at least one solids containment container, said switch valve for selectively directing liquids to said at least one liquid storage container and solids to said at least one solids containment container.

11. The system of claim 1, said waste water collection and storage subsystem further comprising:
   (a) a switch valve;
   (b) an at least partially shared inlet conduit to said at least one liquid storage container and to said at least one solids containment container;
   (c) said switch valve for selectively directing liquids from said storm water management technology to said at least one liquid storage container, and solids from said storm water management technology to said at least one solids containment container;
   (d) a waste water regeneration subsystem for at least partially regenerating said waste water from said waste water collection and storage subsystem to create regenerated water; and
   (e) a distinct return conduit from said at least one liquid storage container to said storm water management technology for returning said regenerated water to said storm water management technology.

12. The system of claim 1, said waste water collection and storage subsystem further comprising:
   (a) a switch valve;
   (b) an at least partially shared inlet conduit to said at least one liquid storage container and to said at least one solids containment container;
   (c) said switch valve for selectively directing liquids from said storm water management technology to said at least one liquid storage container, and solids from said storm water management technology to said at least one solids containment container;
   (d) a waste water regeneration subsystem for at least partially regenerating said waste water from said waste water collection and storage subsystem to create regenerated water; and
   (e) said switch valve and said at least partially shared inlet conduit being configurable to return said regenerated water from said at least one liquid storage container to said storm water management technology.

13. A storm water management technology servicing system, said storm water management technology having a gravity separated top liquid waste water portion and a bottom solid sediment portion, said system comprising:
   (a) a waste water collection and storage subsystem for removing waste water from said top liquid waste water portion of said storm water management technology, said waste water collection and storage subsystem including at least one liquid suction apparatus and at least one liquid storage container, said waste water being transferrable from said storm water management technology to said at least one liquid storage container via said at least one liquid suction apparatus;
   (b) a sediment collection and storage subsystem for removing sediment from said bottom solid sediment portion of said storm water management technology, said sediment collection and storage subsystem including at least one solids suction apparatus and at least one solids containment container, said sediment being transferrable from said storm water management technology to said at least one solids containment container via said at least one solids suction apparatus; and
   (c) a waste water regeneration subsystem for at least partially regenerating said waste water from said waste water collection and storage subsystem to create regenerated water, said waste water regeneration subsystem including at least one recirculation subsystem, said recirculation subsystem including at least one filter, said waste water recirculating from said liquid storage container, through said at least one filter, and back to said liquid storage container;
   (d) wherein said waste water in said at least one liquid storage container is separated from said sediment in said at least one solids containment container.

14. The system of claim 13, said waste water regeneration subsystem for performing at least one treatment step to create said regenerated water, said regenerated water returnable to said storm water management technology.

15. The system of claim 13, said waste water regeneration subsystem for performing at least one treatment step to create said regenerated water, said regenerated water returnable to a regenerated water disposal site.

16. The system of claim 13 further comprising a pressure washing subsystem for pressure washing said storm water management technology.

17. The system of claim 13 further comprising a pressure washing subsystem for pressure washing said storm water management technology, said pressure washing subsystem using said regenerated water to pressure wash said storm water management technology.

18. The system of claim 13, said waste water collection and storage subsystem further including an inlet conduit to said at least one liquid storage container, said sediment collection and storage subsystem further including an inlet conduit to said at least one solids containment container, said inlet conduit to said at least one liquid storage container being distinct from said inlet conduit to said at least one solids containment container.

19. The system of claim 13, said system further comprising a switch valve, said waste water collection and storage subsystem further including an at least partially shared inlet conduit to said at least one liquid storage container and to said at least one solids containment container, said switch valve for selectively directing liquids to said at least one liquid storage container and solids to said at least one solids containment container.

20. The system of claim 13, said waste water collection and storage subsystem further comprising:
   (a) said at least one liquid suction apparatus and said at lest one solids suction apparatus comprising a switch valve and an at least partially shared inlet conduit to said at least one liquid storage container and to said at least one solids containment container;
   (b) said switch valve for selectively directing liquids from said storm water management technology to said at least one liquid storage container, and solids from said storm water management technology to said at least one solids containment container; and
   (c) a distinct return conduit from said at least one liquid storage container to said storm water management technology for returning said regenerated water to said storm water management technology.

21. The system of claim 13, said waste water collection and storage subsystem further comprising:

(a) said at least one liquid suction apparatus and said at lest one solids suction apparatus comprising a switch valve and an at least partially shared inlet conduit to said at least one liquid storage container and to said at least one solids containment container;

(b) said switch valve for selectively directing liquids from said storm water management technology to said at least one liquid storage container, and solids from said storm water management technology to said at least one solids containment container; and (c) said switch valve and said at least partially shared inlet conduit being configurable to return said regenerated water from said at least one liquid storage container to said storm water management technology.

22. A method for servicing storm water management technology, said storm water management technology having a gravity separated top liquid waste water portion and a bottom solid sediment portion, said method comprising the steps of:

(a) removing waste water from said top liquid waste water portion of said storm water management technology;

(b) after said step of removing said waste water from said storm water management technology, removing sediment from said bottom solid sediment portion of said storm water management technology; and (c) at least partially regenerating said waste water to create regenerated water, said step of at least partially regenerating waste water further comprising the step of at least partially recirculating said waste water through at least one filter.

23. The method of claim 22 further comprising the step of returning said regenerated water to said storm water management technology.

24. The method of claim 22 further comprising the step of disposing of said regenerated water at a regenerated water disposal site.

25. The method of claim 22 further comprising the step of pressure washing said storm water management technology.

26. The method of claim 22 further comprising the step of pressure washing said storm water management technology using said regenerated water.

27. The method of claim 22, said step of removing waste water further comprising the step of using at least one liquid suction apparatus to transfer said waste water from said storm water management technology to at least one liquid storage container, said step of at least partially recirculating said waste water further comprising the steps of recirculating said waste water from said at least one liquid storage container, through said at least one filter, and back to said at least one liquid storage container.

28. The method of claim 22, said step of removing sediment further comprising the step of using at least one solids suction apparatus to transfer said sediment from said storm water management technology to at least one solids containment container.

29. The method of claim 22, said step of at least partially regenerating said waste water further comprising the step of performing at least one treatment step.

30. The method of claim 22, said step of removing waste water further comprising the step of using at least one liquid suction apparatus to transfer said waste water from said storm water management technology to at least one liquid storage container, and said step of removing sediment further comprising the step of using at least one solids suction apparatus to transfer said sediment from said storm water management technology to at least one solids containment container.

31. The method of claim 22, said step of removing waste water further comprising the step of using at least one liquid suction apparatus and a first inlet conduit to transfer said waste water from said storm water management technology to at least one liquid storage container, and said step of removing sediment further comprising the step of using at least one solids suction apparatus and a second inlet conduit to transfer said sediment from said storm water management technology to at least one solids containment container, wherein said first inlet conduit is distinct from said second inlet conduit.

32. The method of claim 22, said step of removing waste water further comprising the step of using at least one liquid suction apparatus and an at least partially shared inlet conduit to transfer said waste water from said storm water management technology to at least one liquid storage container, and said step of removing sediment further comprising the step of using at least one solids suction apparatus and said at least partially shared inlet conduit to transfer said sediment from said storm water management technology to at least one solids containment container, and selectively directing liquids to said at least one liquid storage container and solids to said at least one solids containment container using a switch valve.

33. The method of claim 22, further comprising:

(a) configuring a switch valve; and an at least partially shared inlet conduit to remove said waste water and transfer solid waste water to an at least one liquid storage container;

(b) configuring said switch valve and said at least partially shared inlet conduit to remove said sediment and transfer said sediment to an at least one solids containment container; and (c) returning said regenerated water to said storm water management technology using a distinct return conduit from said at least one liquid storage container to said storm water management technology.

34. The method of claim 22, further comprising:

(a) configuring a switch valve; and an at least partially shared inlet conduit to remove said waste water and transfer solid waste water to an at least one liquid storage container;

(b) configuring said switch valve and said at least partially shared inlet conduit to remove said sediment and transfer said sediment to an at least one solids containment container; and (c) configuring said switch valve and said at least partially shared inlet conduit to return said regenerated water from said at least one liquid storage container to said storm water management technology.

* * * * *